Dec. 22, 1925.
C. G. CLEMENT
ADJUSTABLE DRAWBAR
Filed Sept. 16, 1922     3 Sheets-Sheet 2
1,566,831
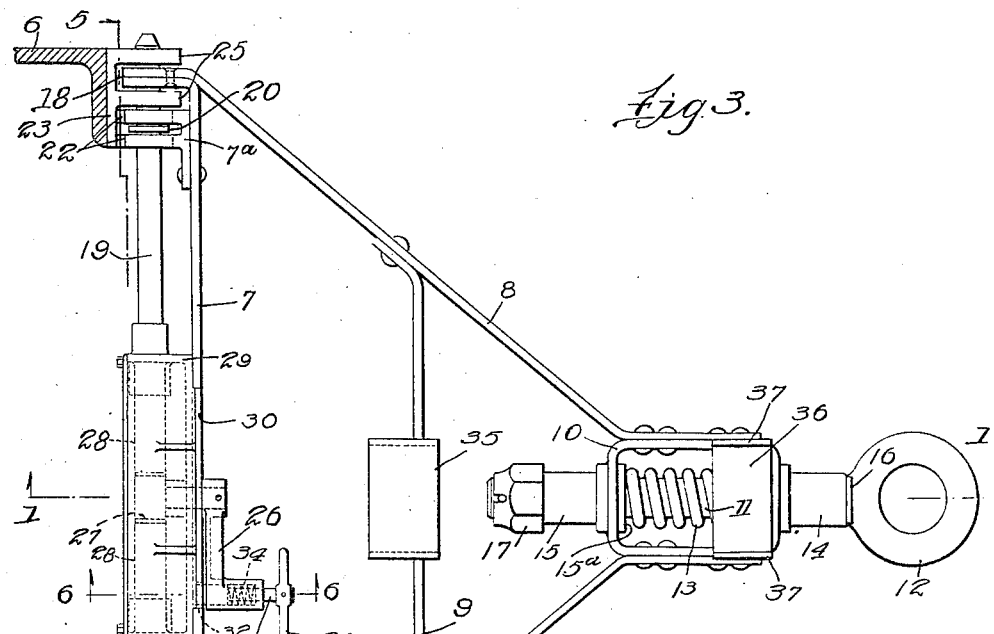
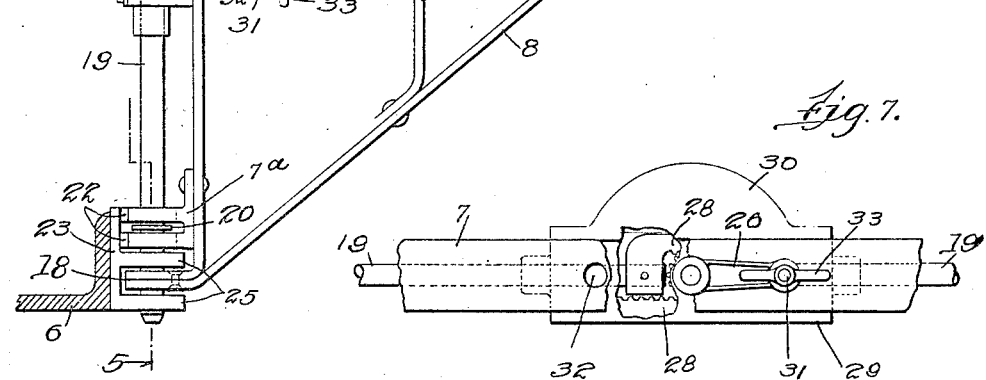
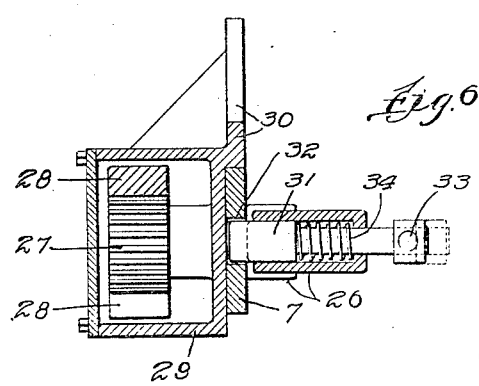
Inventor:
Charles G. Clement,
by Burton & Burton
his Attys.

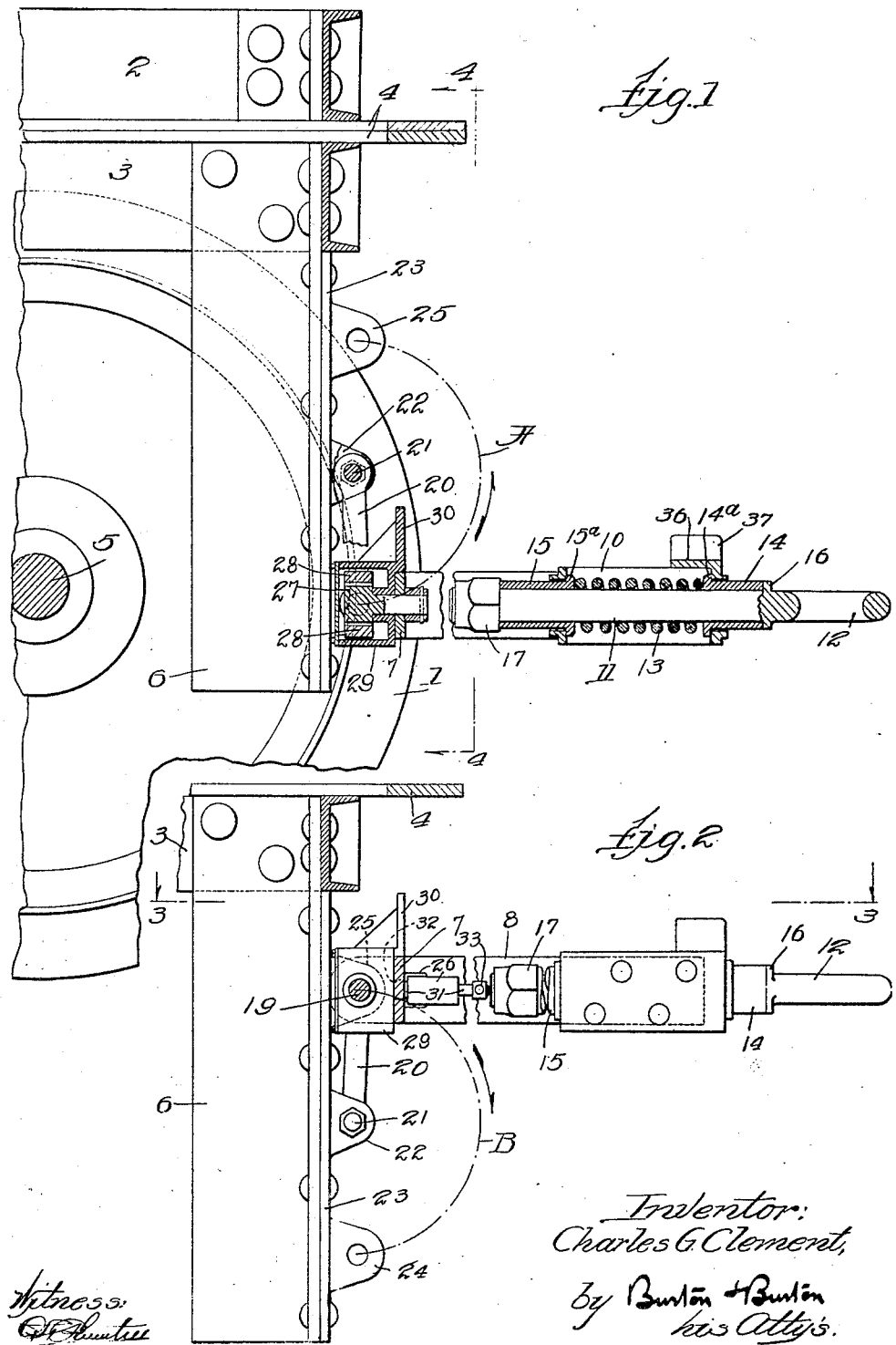

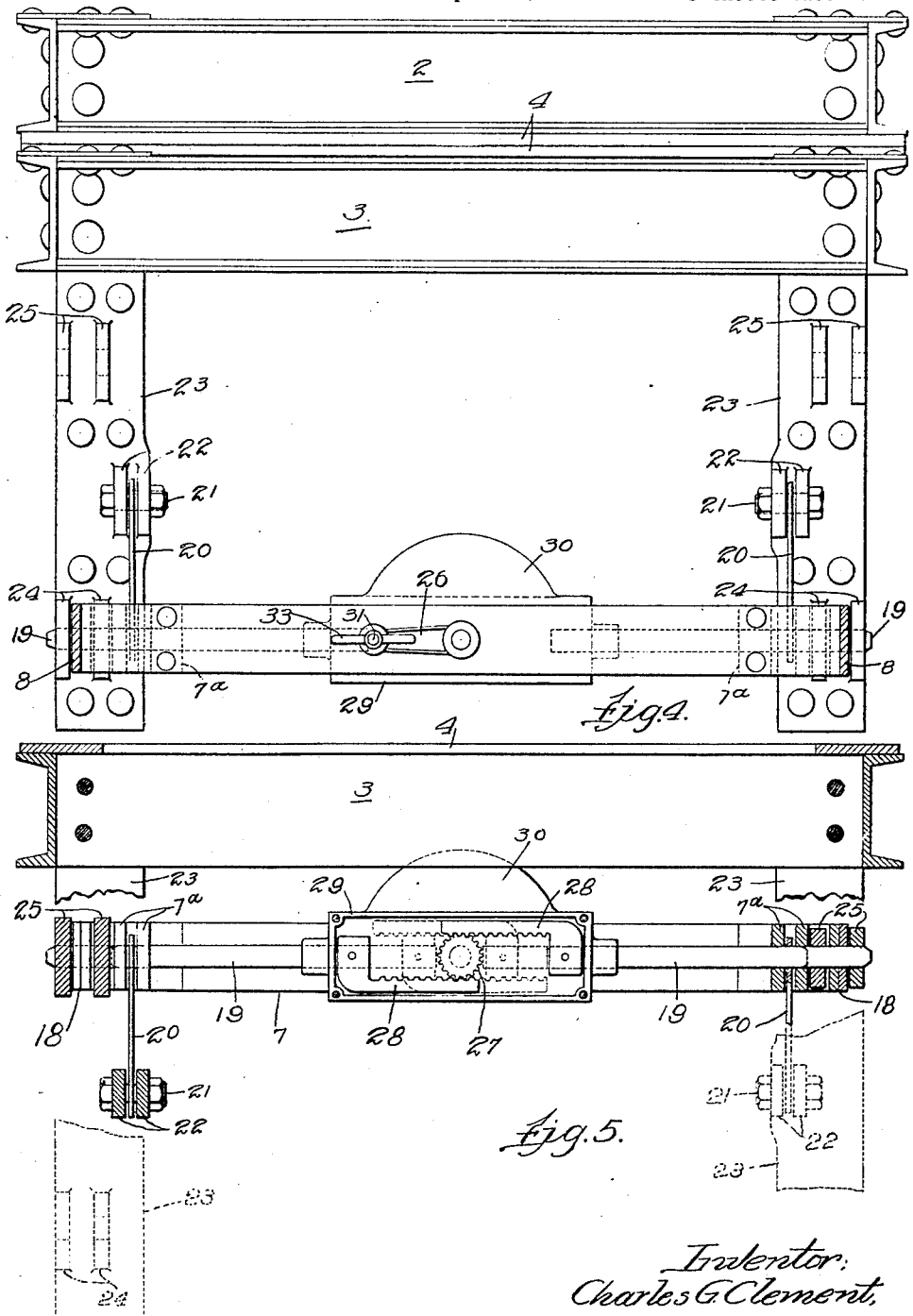

Patented Dec. 22, 1925.

1,566,831

UNITED STATES PATENT OFFICE.

CHARLES G. CLEMENT, OF EDGERTON, WISCONSIN, ASSIGNOR TO HIGHWAY TRAILER COMPANY, OF EDGERTON, WISCONSIN, A CORPORATION OF WISCONSIN.

ADJUSTABLE DRAWBAR.

Application filed September 16, 1922. Serial No. 588,556.

*To all whom it may concern:*

Be it known that I, CHARLES G. CLEMENT, a citizen of the United States, and a resident of Edgerton, in the county of Rock and the State of Wisconsin, have invented certain new and useful Improvements in Adjustable Drawbars, of which the following is a specification, reference being had to the accompanying drawings, forming a part thereof.

The purpose of this invention is to provide a drawbar for a trailer vehicle adapted for quick adjustment to a higher or lower position as desired, to facilitate connecting the trailer to different types of motor vehicles provided with coupling means at different heights. With present standards of construction, the coupler of the average motor truck is disposed at a level considerably above that of the axle, whereas the coupler of a tractor is arranged closer to the ground. The invention, therefore, consists in certain features and elements of construction and their combination as hereinafter described and shown in the drawings and as indicated by the claims.

In the drawings:

Figure 1 is a substantially medial vertical section of the front end of the trailer vehicle, equipped with a drawbar embodying this invention, certain parts being broken away, and the section being taken as indicated at line 1—1 on Figure 3.

Figure 2 is a fragmental view similar to Figure 1, showing the drawbar at a different position of adjustment and presenting some details in elevation instead of in section.

Figure 3 is a plan view of the drawbar and its mounting on the vehicle frame, the frame being shown in section at line 3—3 on Figure 2.

Figure 4 is a front elevation of the mounting and adjusting means for the drawbar taken as a vertical section at the line 4—4 on Figure 1.

Figure 5 is a detail section taken as indicated at line 5—5 on Figure 3.

Figure 6 is a detail section taken as indicated at line 6—6 on Figure 3.

Figure 7 is a front elevation with parts broken away, showing the adjusting means for the locking bolts of the drawbar.

The trailer chosen for purposes of illustration may be understood as a four-wheeled vehicle in which the wheels, 1, at one end are dirigibly associated with the body frame, 2, through the medium of a subframe, 3, and a fifth wheel composed of flat circular members, 4, 4, mounted to turn upon each other and secured respectively to the frames, 2 and 3. The frame, 3, is positively connected to the axle, 5, preferably through a spring mounting, not shown, and at its further corners is provided with rigidly depending angular members, 6, for attachment of a drawbar.

As seen in Figure 3, the drawbar includes a triangular frame portion having a transverse member, 7, and oblique side members, 8, 8, which are also connected by a cross brace, 9, and a guide fitting, 10, in which the drawhead, 11, is slidably mounted. Said head terminates in an eye, 12, adapted to engage any standard motor vehicle coupler, and is cushioned in the guide fitting, 10, by means of a coiled spring, 13, reacting against the flanges 14$^a$ and 15$^a$ of bushings, 14 and 15, respectively, set in opposite ends of the guide fitting, 10. Adjacent the eye, 12, the drawhead, 11, is flanged at 16 and thus stopped against the bushing, 14, and at the opposite end the shank of the drawhead is fitted with a nut, 17, which stops against the bushing, 15, as shown in section in Figure 1. Thus the shank, 11, will slide through one of the bushings while carrying the other bushing with it through its guide opening in the fitting, 10, and compressing the spring, 13, whenever any considerable force is applied to the eye, 12, whether it be a push or a pull.

At the broad end of the triangular frame which constitutes the drawbar, the terminal portions of the side members, 8, are bent and lapped against the bent ends of the transverse member, 7, to form attaching lugs, 18, which are apertured to receive locking bolts, 19. These lugs are supplemented by wrought or cast bifurcated fittings, 7$^a$, through which the locking bolts, 19, extend for pivotal engagement with the ends of link members, 20. At their opposite ends, the links are carried on pivots, 21, each supported by lugs, 22, which extend from a base plate, 23, secured to the front face of each of the depending angles, 6, of the opposite front corner of the frame, 3. The bolts, 19, are transversely slidable, being mounted upon the transverse member, 7, of the drawbar, and the base plates, 23, are each provided with two pairs of apertured lugs, 24 and 25, respectively, at lower and higher positions, as seen in Figures 1, 2 and 4. The mounting lugs, 22, in which the link pivots, 21, are guided, are located midway between the lugs, 24, and lugs, 25, so that the links, 20, may swing in vertical arcs to guide the drawbar from one position to the other. At either limit of adjustment, the lugs, 18, enter between the lugs, 24 or 25, and the bolts, 19, are moved outwardly through the apertures of said lugs, 24 or 25, to secure the drawbar to the frame.

The sliding adjustment of the bolts, 19, is accomplished by a crank, 26, which rotates a spur pinion, 27, meshing with rack bars, 28, attached to the inner ends of the bolts, 19, and engaging opposite sides of the pinion, 27, as shown in Figure 5. The racks and pinion are enclosed in a casing, 29, having a face plate, 30, which the crank, 26, traverses in swinging from one limit to the other. This swing is designed to be about 180°, so that the crank arm extends horizontally at either limit, and at the position in which the bolts, 19, are protruded outwardly to engage the lugs, 24 or 25, a detent bolt, 31, enters an aperture, 32, in the part, 7, which is flush with the face plate, 30, as shown in Figure 6. This detent is slidably housed in the end of the crank, 26, and is provided with a handle, 33, by which it may be readily withdrawn against the pressure of the pocketed spring, 34, when it is desired to release the bolts, 19, for shifting the drawbar to its other position.

Figure 1 illustrates the parts adjusted in the lower position with the drawbar locked to the lugs, 24, by the bolts, 19. This adapts the trailer for connection to a tractor of ordinary construction. To shift the drawbar to the upper position, it is only necessary to pull out the detent handle, 33, and rotate the crank, 26, to the position shown in Figure 7, thus releasing the bolts, 19, and permitting the triangularly framed drawbar to be swung forwardly and upwardly through the arc, A, of Figure 1, for entering the terminals, 18, between the lugs, 25. The links, 20, will temporarily support part of the weight of the drawbar in this position until the crank, 26, can be rotated back to the position shown in Figure 4, so that the detent bolt, 31, may engage the aperture, 32, for retention of the bolts, 19. The reversal of these steps is all that is necessary for returning the parts through the arc, B, shown in Figure 2, when the lower adjustment of the drawbar is again desired.

It may be noted that the drawbar includes a hollow square socket, 35, and a flat seat, 36, with upstanding guard flanges, 37,—these features being adapted to accommodate the end of a wagon tongue when it is desired to attach horses to the trailer.

I claim:

1. In combination with a vehicle frame, a drawbar with a link connected to the frame and to the drawbar by horizontal pivots extending transversely of the vehicle, whereby said link is adapted to swing up or down to guide the drawbar into a higher or lower position, and means for connecting the drawbar to the frame independently of said link at either the higher or the lower position.

2. In the combination defined in claim 1, said connecting means comprising apertured lugs and a locking bolt to cooperate therewith, one of said parts being on the frame and the other on the drawbar.

3. In the combination defined in claim 1, said connecting means comprising apertured lugs on the frame and a locking bolt slidably carried on the drawbar.

4. In combination with a vehicle frame, a drawbar comprising a transverse portion extending substantially across the vehicle frame and a central drawhead projecting longitudinally therefrom, a pair of links connecting the transverse part of the drawbar to the frame at laterally separated points by means of horizontal pivots on the frame and on the drawbar to permit swinging the drawbar between the lower and a higher position with respect to said frame, and means for locking the drawbar to the frame at either of said positions.

5. In the combination defined in claim 4 a locking means comprising a pair of bolts slidably carried on the transverse part of the drawbar, apertured lugs on the frame to receive said bolts in the upper or lower position of the draw bar and manually operable means on said transverse portion connected to the bolts and adapted for simultaneously moving them in opposite directions.

6. In the combination defined in claim 4, the locking means comprising a pair of bolts slidably carried on the transverse part of the drawbar, means on the frame to receive said bolts, at the upper or lower position of the drawbar, a gear journalled on said transverse part and racks on the inner ends of the bolts respectively meshing with the gear at opposite sides thereof so that rotation of the gear will withdraw or thrust the bolts laterally.

7. In the combination defined in claim 4, the locking means comprising a pair of axially aligned bolts slidably carried on the transverse part of the drawbar and serving also as the pivots which connect the links thereto, together with apertured lugs on the frame positioned to register with said bolts in the upper and lower positions of the drawbar and means for sliding the bolts laterally upon said transverse part through a limited distance for engagement with said lugs or withdrawal therefrom.

8. In the combination defined in claim 4, the transverse portion of the drawbar having lugs projecting in pairs from its rear face at laterally separated points, the locking means comprising a pair of bolts supported slidably in said lugs for limited movement therethrough and apertured lugs in pairs on the frame positioned to register with said bolts in the upper and lower positions of the drawbar and to interlap with the paired lugs of the drawbar together with means for sliding the bolts through said lugs.

9. In the combination defined in claim 4 the locking means comprising a pair of bolts slidably carried by the transverse portion of the drawbar with racks on their inner ends and a gear pinion journalled on said transverse portion meshing with both racks, a crank handle to rotate said gear and a detent in the handle co-operating with a part of the drawbar to retain the bolts in their outwardly thrust positions together with apertured lugs on the frame positioned to be engaged by said bolts in the upper and lower positions of adjustment of the drawbar.

In testimony whereof I have hereunto set my hand at Edgerton, Wisconsin, this 13th day of Sept., 1922.

CHARLES G. CLEMENT.